United States Patent
Greening et al.

(10) Patent No.: US 7,336,364 B2
(45) Date of Patent: Feb. 26, 2008

(54) MINIMAL BIAS SWITCHING FOR FIBER OPTIC GYROSCOPES

(75) Inventors: Thomas C. Greening, Peoria, AZ (US); Sven H. Khatri, Baltimore, MD (US); Matthew P. Newlin, Seattle, WA (US)

(73) Assignee: Honeywell International, Inc., Morristown, NJ (US)

( * ) Notice: Subject to any disclaimer, the term of this patent is extended or adjusted under 35 U.S.C. 154(b) by 148 days.

(21) Appl. No.: 11/290,311

(22) Filed: Nov. 29, 2005

(65) Prior Publication Data

US 2007/0121116 A1    May 31, 2007

(51) Int. Cl.
*G01C 19/72* (2006.01)
(52) U.S. Cl. .................................... 356/464
(58) Field of Classification Search ............... 356/460, 356/464

See application file for complete search history.

(56) References Cited

U.S. PATENT DOCUMENTS

| | | | | |
|---|---|---|---|---|
| 5,116,127 A | * | 5/1992 | Grollmann | 356/464 |
| 5,371,594 A | * | 12/1994 | Welling et al. | 356/464 |
| 5,684,589 A | * | 11/1997 | Mark et al. | 356/464 |

* cited by examiner

*Primary Examiner*—Samuel A. Turner
(74) *Attorney, Agent, or Firm*—Black Lowe & Graham PLLC (57) ABSTRACT

A system and method is provided for reducing the sensitivity of the rotation rate measurement to the frequency dependence of the feedback modulator. Specifically, the system and method uses a minimal bias switching technique to reduce rate errors associated with the low frequency $2\pi$ resets in a closed loop fiber optic gyroscope with a phase modulator with a different phase shift associated to low and high frequencies. In general, the minimal bias switching technique reduces the low frequency components of the feedback modulation drive by increasing the frequency of the $2\pi$ resets. As a consequence, the system and method reduces the low frequency component of the feedback modulator drive to avoid errors that occur with the low frequency $2\pi$ resets.

14 Claims, 6 Drawing Sheets

MINIMAL BIAS SWITCHING FOR FIBER OPTIC GYROSCOPES

STATEMENT REGARDING FEDERALLY SPONSORED RESEARCH OR DEVELOPMENT

This invention was made with Government support under contract 009Z9004 awarded from the Boeing Corporation. The Government has certain rights in this invention.

FIELD OF THE INVENTION

This invention generally relates to fiber optic gyroscopes, and more specifically relates to feedback modulation in closed-loop fiber optic gyroscopes.

BACKGROUND OF THE INVENTION

Fiber optic gyroscopes are used to accurately sense rotation of an object supporting such a gyroscope. Fiber optic gyroscopes can be made quite small and can be constructed to withstand considerable mechanical shock, temperature change, and other environmental extremes. Due to the absence of moving parts, they can be nearly maintenance free. Furthermore, they can be highly sensitive to very low rotation rates that can be a problem in other kinds of optical gyroscopes.

A typical fiber optic gyroscope includes a coiled optical fiber wound on a core and about the axis around which rotation is to be sensed. The optical fiber provides a closed optical path in which an electromagnetic wave is introduced and split into a pair of waves that propagate in opposite directions and ultimately impinge on a photodetector. During use, a rotation about the sensing axis of the core provides an effective optical path length increase in one rotational direction, and an optical path length decrease in the other rotational direction. The resulting path length difference results in a phase shift between the waves propagating in opposite directions. This result is generally referred to as the Sagnac effect. In a fiber optic gyroscope, the phase shift resulting from the Sagnac effect is used to determine rotation around the axis. Specifically, waves propagating in opposite directions interfere when recombined and impinge upon photodetector, which measure the intensity of the combined wave. The output of the photodetector, which is a measure of the amount of interference, is used to determine the phase difference in the counter-propagating beams, and thus is used to determine rotation around the axis.

In many fiber optic gyroscopes, the traveling electromagnetic waves are modulated by placing an optical phase modulator in the optical path on one or both sides of the coiled optical fiber. This modulation is used to overcome directional ambiguity by introducing a phase shift to the incoming and outgoing waves in the optical fiber. As one example, the phase modulation is achieved by applying a modulating signal across the electrodes of the optical phase modulator. Typically, the modulating signal is a square wave with a period equal to twice the transit time of the light through the coil. The modulating signal causes the photodetector to measure the intensity at two different points in the raised cosine interferogram. The rotation rate and direction can then be determined by the difference in the emitted intensity at the two different measured points.

Some fiber optic gyroscopes operate in a closed loop manner. In closed loop operation, an additional phase shift, equal and opposite to the rotation-induced phase shift, is introduced in addition to the bias modulation. Specifically, in closed loop operation a servo introduces the feedback phase needed to keep the difference in the emitted intensity at the two different measured points zero. In such a closed loop operation, the rotation rate can then be determined by measuring the feedback phase shift needed to null the difference in the measured photodetector intensities. Closed loop operation has many advantages. For example, the output is more stable and linear compared to open loop operation. Additionally, since the rate is determined by measuring the feedback phase, the resulting output does not depend upon the measured total intensity at the photodetectors, and thus has less susceptibility to variations in intensity from temperature, radiation or vibration.

One issue in closed loop fiber optic gyroscopes is that the phase shift needed to null the intensity difference can increase beyond the output range of the optical modulator. For example, for a constant rate rotation situation the phase shift needed to null the intensity difference would be a continually increasing ramp. However, the amount of modulation that can be provided is limited by the circuitry and the range of the optical modulator. To avoid this problem a reset voltage is added or subtracted to the feedback modulation when the feedback modulation nears the optical modulator drive voltage limit. For example, a reset voltage corresponding to a phase change of $2\pi$ a can be added or subtracted from the feedback modulation voltage without generating a rate error. This periodic adjustment of the feedback modulation voltage is generally referred to as a $2\pi$ reset.

A key enabling technology to closed loop fiber optic gyroscopes is the optical waveguide device that converts an applied electric signal into an optical phase shift. A number of materials possess the ability to convert an electric field into an optical phase shift, with lithium niobate ($LiNbO_3$) being a commonly used material. An electric field applied across a waveguide formed in the lithium niobate or other suitable material changes the index of refraction in the waveguide thus causing the phase of the optical wave to advance or retard depending on the direction of the applied field. For a hypothetical perfect modulator, the phase modulation $\phi(t)$ obtained from an applied voltage $V(t)$ is:

$$\phi(t) = \frac{\pi}{V_\pi} V(t),$$

where $V_\pi$ is the modulator electrical-to-optical gain.

For the perfect modulator, $V_\pi$ is constant. Unfortunately, in real modulators, $V_\pi$ can often depend upon many environmental factors such as temperature, radiation, and humidity. To account for a varying $V_\pi$, $V_\pi$ is typically measured using a variety of modulation techniques. Accurate knowledge of $V_\pi$ is needed to ensure perfect $2\pi$ steps every time the feedback ramp resets. If the reset overshoots or undershoots $2\pi$, then a rate error is generated.

A problem not addressed by $V_\pi$ measurement systems is that $V_\pi$ can also depend upon the frequency of the applied voltage. Mechanisms for such frequency dependence include trapped charge in the lithium niobate or absorption of water in the lithium niobate surface. These mechanisms can be affected by humidity, temperature, pressure, radiation, and time. A simple first order time invariant model of the modulator dynamics, written in the Laplace domain, relates the phase modulation $\phi(s)$ to the applied voltage $V(s)$ $$\phi(s) = \frac{\pi}{V_\pi} \cdot \frac{t_c s + d}{t_c s + 1} \cdot V(s)$$

When d=1 the transfer function is identity and both the step response and the frequency response of the modulator are perfect. When d≠1, the initial step response is still good, corresponding to good high frequency performance, but there is an exponential decay with time constant $t_c$ to a steady state value of d times the size of the step input. This decay corresponds to degraded low frequency performance of the modulator. When the closed loop fiber optic gyroscope emits a 2π reset command at the drive voltage limit, the initial modulator response is good. The subsequent changing phase modulation, due to the decay of the modulator's step response, results in a phase shift that is indistinguishable from the rotation-induced Sagnac phase shift. Since rotation is based on the feedback voltage needed to null the induced phase shift, the frequency dependence of $V_\pi$ introduces a rate error that can be significant for some applications.

Thus, what is needed is a system and method for reducing the sensitivity of the rate measurement to the frequency dependence of the feedback modulator.

BRIEF SUMMARY OF THE INVENTION

The present invention provides a system and method for reducing the sensitivity of the rotation rate measurement to the frequency dependence of the feedback modulator. Specifically, the system and method uses a minimal bias switching technique to reduce rate errors associated with the low frequency 2π resets in a closed loop fiber optic gyroscope with a phase modulator with a different phase shift associated to low and high frequencies. In general, the minimal bias switching technique reduces the low frequency components of the feedback modulation drive by increasing the frequency of the 2π resets. As a consequence, the system and method reduces the low frequency component of the feedback modulator drive to avoid errors that occur with the low frequency 2π resets.

In operation, the minimal bias switching technique performs a 2π reset if such a reset is predicted to reduce the integrated voltage of the modulator drive, referred to as the modulator bias. Specifically, the minimal bias technique predicts the integrated modulator bias for both with and without a 2π reset. Then, the minimal bias technique selects the option that results in the integrated modulator bias being closest to zero. Thus, if a reset would reduce the magnitude of the integrated bias voltage then the reset is performed. If a reset would instead increase the magnitude, then it is not performed.

The result of predicting the integrated bias voltage and selectively performing 2π resets is that the 2π resets are performed at a higher frequency selected to drive the integrated bias voltage closer to zero. By reducing the low frequency content of the feedback modulation, the system and method reduces the sensitivity to errors associated with phase modulators that have a different response at low and high frequencies.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The embodiments of the invention provide a system and method for reducing the sensitivity of the rotation rate measurement to the frequency dependence of the feedback modulator. Specifically, the system and method uses a minimal bias switching technique to reduce rate errors associated with the low frequency 2π resets in a closed loop fiber optic gyroscope with a phase modulator with a different phase shift associated to low and high frequencies. In general, the minimal bias switching technique reduces the low frequency components of the feedback modulation drive by increasing the frequency of the 2π resets. As a consequence, the system and method reduces the low frequency component of the feedback modulator drive to avoid errors that occur with the low frequency 2π resets.

In operation, the minimal bias switching technique performs a 2π reset if such a reset is predicted to reduce the integrated voltage of the modulator drive, referred to as the modulator bias. Specifically, the minimal bias technique predicts the integrated modulator bias for both with and without a 2π reset. Then, the minimal bias technique selects the option that results in the integrated modulator bias being closest to zero. Thus, if a reset would reduce the magnitude of the integrated bias voltage then the reset is performed. If a reset would instead increase the magnitude, then it is not performed. The result of predicting the integrated bias voltage and selectively performing 2π resets is that the 2π resets are performed at a high frequency selected to drive the integrated bias voltage closer to zero. By reducing the low frequency content of the feedback modulation, the system and method reduces the sensitivity to errors associated with phase modulators that have a different response at low and high frequencies.

Figure 1:
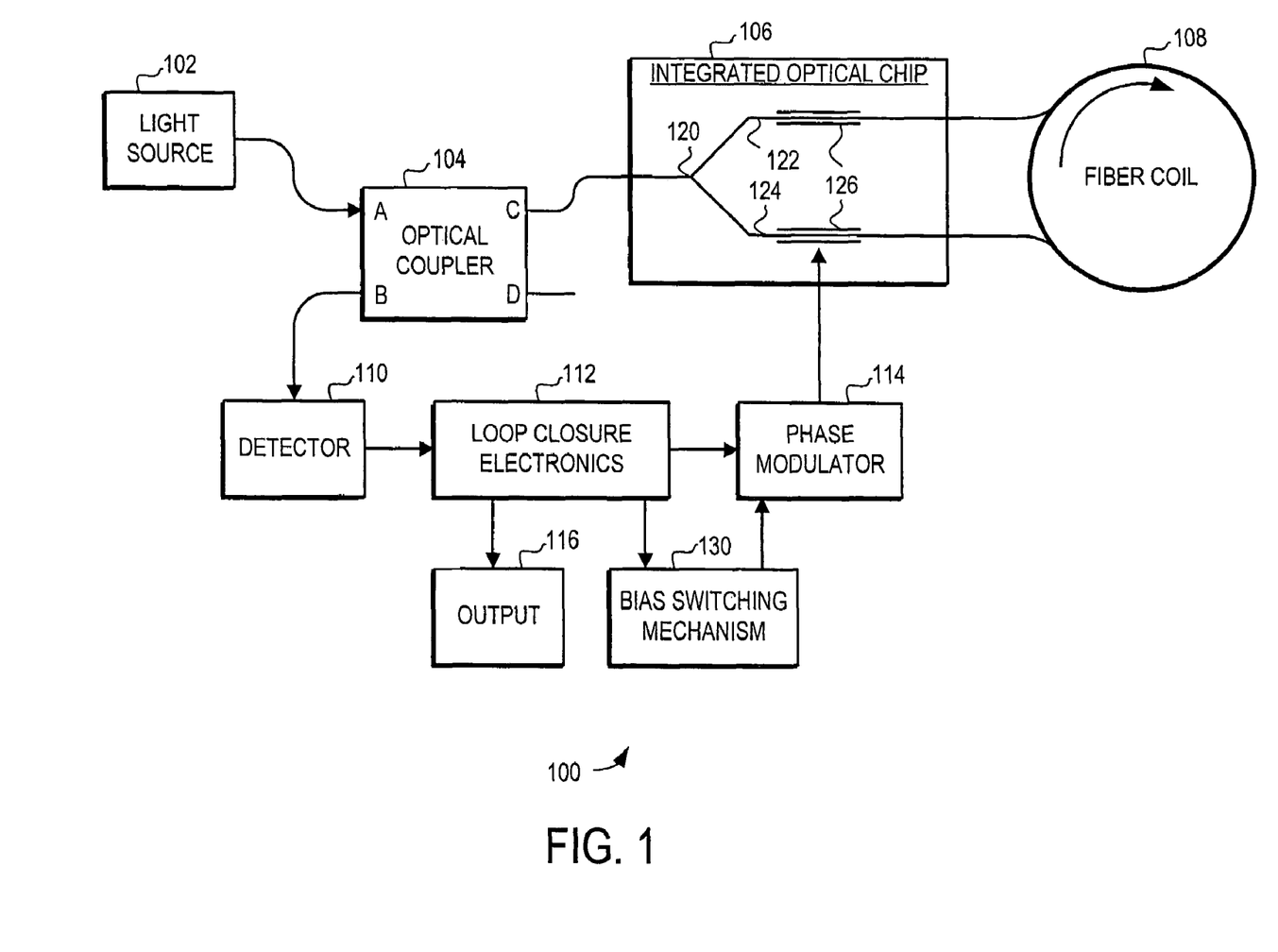
FIG. 1 is a schematic view of an exemplary fiber optic gyroscope in accordance with an embodiment of the invention.

Turning now to FIG. 1, an exemplary interferometric fiber optic gyroscope (IFOG) 100 is illustrated schematically. The IFOG 100 includes a light source 102, an optical coupler 104, an integrated optical chip 106, a fiber optic coil 108, a detector 110, loop closure electronics 112, and a phase modulator 114. Additionally, the IFOG 100 includes a bias switching mechanism 130 that performs 2π resets when such a reset is predicted to reduce the integrated voltage of the modulator drive, thereby avoiding errors that could occur with low frequency 2π resets. It should be noted that the IFOG 100 is merely exemplary of the type of IFOGs that the clock system can be implemented in, and that other suitable implantations can include other combinations of elements.

The fiber optic coil 108 is typically wound around a core and about an axis around which rotation is sensed. The fiber optic coil 108 is typically long, on the order of between 50 and 2000 meters. The fiber optic coil provides the closed optical path in which an electromagnetic wave is split and propagates in opposite directions, ultimately impinging on the detector 110. Rotation about the sensing axis in one direction causes an effective increase in the optical path length for one direction, and a decrease in the optical path length in the other direction. The path length difference introduces a phase shift between the waves, a result known as the Sagnac effect.

The coiling of optical fiber in the fiber optic coil 108 is desirable because the amount of phase shift due to rotation is dependent on the length of the entire optical path through the coil traversed by the two waves traveling in opposite directions. Therefore, a large phase difference can be obtained in a long optical fiber that occupies a relatively small volume as a result of being coiled.

The light source 102 provides the light that propagates through the IFOG 100. The light source 102 can be any suitable light source for propagating electromagnetic waves through the fiber optics system 100. For example, the light source 102 can comprise pump laser that includes a semiconductor super luminescent diode. Alternatively, the light source can comprise a rare earth doped fiber light source. Generally, it is desirable that the light source provide a stable output of a selected wavelength with relatively high efficiency.

The light source 102 is connected to the optical coupler 104 using a suitable optical path, typically comprising optical fibers. The optical coupler 104, sometimes referred to as a fiber coupler, optical light beam coupler or wave combiner and splitter, has light transmission media which extend between four ports A, B, C and D. Port A is connected to the light source 102, port B is connected to the detector 110, and port C is coupled to the integrated optical chip 106.

In general, when the optical coupler 104 receives electromagnetic waves at any of its ports, the optical coupler 104 transmits the waves such that approximately half of the transmitted light appears at each of the two ports on the opposite end of the incoming port. At same time, substantially no electromagnetic waves are transmitted to the port which is at the same end as the incoming port. For example, light received at port A will be transmitted to ports C and D, but will not be substantially transmitted to port B. Similarly, waves received at port C will be transmitted to ports A and B, but not to port D, and so on.

Therefore, during operation light source 102 transmits light to port A of the optical coupler 104. Optical coupler 104 splits the transmitted light and provides the light to ports C and D. The light transmitted to port C is further transmitted to the integrated optical chip 106 via optical fiber or other suitable mechanism.

It should be noted that while the IFOG 100 illustrates the use of an optical coupler 104, that other embodiments of the invention could use different devices in place of the coupler 104. For example, in some fiber optic gyroscope implementations a circulator would be used instead of an optical coupler.

The integrated optical chip 106 includes a Y-junction 120 and waveguides 122 and 124. Additionally, the integrated optical chip 106 includes optical phase modulator electrodes 126 integrated with the waveguides 122 and 124. Again, it should be noted that while IFOG 100 uses an integrated optical chip, that other embodiments of the invention could use other devices. For example, a separate Y-junction or coupler could be used along with a separate modulator.

Inside the integrated optical chip 106 the light is further split at the Y-junction 120 and provided to waveguides 122 and 124. The light provided to wave guide 122 is transmitted to the fiber coil 108, where it propagates clockwise around the length of the fiber coil 108. This light, referred to as the "cw wave", returns to wave guide 124 in the integrated optical chip 106 after propagating through the fiber coil 108. Likewise, the light wave provided to wave guide 124 is transmitted to the fiber coil 108, where it propagates counter-clockwise around the length of the fiber coil 108. This light, referred to as the "ccw wave", returns to wave guide 122 in the integrated optical chip 106 after propagating though the fiber coil 108.

After being transmitted from the fiber coil 108 and passing through their respective wave guides, the cw and ccw waves are combined at the Y-junction 120 and propagate to port C of the optical coupler 104. The combined wave is then split and output at ports A and B. Port B is optically coupled to the detector 110 such that the cw and ccw waves are received at the detector 110. The detector 110 typically comprises a photodetector, such as an appropriate photodiode and a suitable amplifier. Of course, other suitable detectors can be used. When the combined wave arrives at the detector 110, the detector 110 provides an output signal proportional to the intensity of the two waves impinging on the photodetector 110.

The output of the detector 110 is passed to the loop closure electronics 112. In general, the loop closure electronics 112 receives the signal from the detector 110 and drives the integrated optical chip 106 with a feedback phase shift needed to keep the difference in intensity for two measurements of the interferometer zero. Thus, the rotation rate measurement can be calculated from the feedback phase and delivered as output 116.

Figure 2:
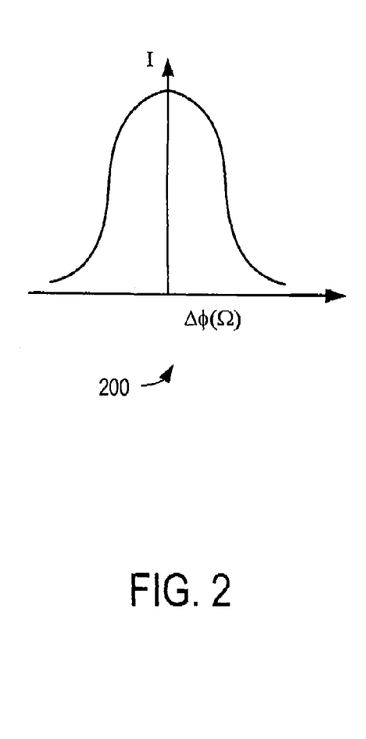
FIGS. 2-5 are exemplary graphical views of cosine interferometer patterns from counter-propagating waves.

When the two counter propagating waves impinge on the detector 110, the output from the detector 110 follows the cosine of the phase difference between the two waves. Turning now to FIG. 2, a graph 200 illustrates the cosine of the phase difference between two exemplary waves impinging on the detector. The pattern illustrated in graph 200 is generally referred to as an interferometer pattern. Since the cosine is an even function, such an output function does not give an indication as to the relative direction of the phase shift. Because of this, the phase difference between the two counter-propagating waves are typically modulated, a process generally referred to as bias modulation.

Figure 3:
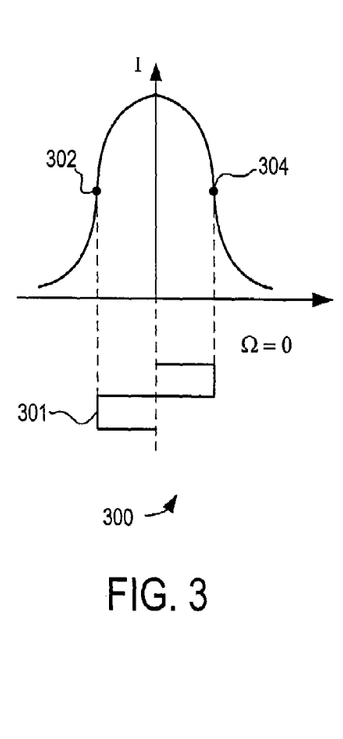
Figure 4:
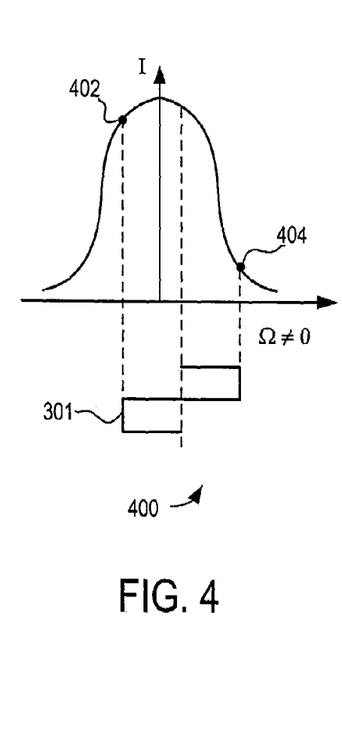

The phase modulator 114 introduces a phase bias modulation by applying a phase shift to the incoming and outgoing waves in the integrated optical chip 106. This modulation is achieved by applying a modulating voltage across electrodes 126 around the wave guides 122 and 124. The application of voltage lengthens or shortens the effective optical path length, thereby introducing an optical phase shift proportional to the applied voltage. Typically, the phase modulator 114 applies a square with a half period equal to the transit time of the light through the coil. The bias modulation causes the detection points in the interferometer to shift, such that the detector 110 no longer measures the intensity at the top of the interferometer, but rather at two offset points. The rotation rate, measured at the detector 110, is then proportional to the difference in the emitted intensity at the two offset points. Turning now to FIGS. 3 and 4, graphs 300 and 400 illustrate bias modulation on the interferometer pattern. Specifically, graph 300 illustrates how a square wave bias modulation signal 301 causes the detector to measure the difference in emitted intensity at offset points 302 and 304. Thus, the rotation rate is now proportional to the difference in the emitted intensity at points 302 and 304. In graph 300, there is no rotation ($\Omega=0$) and the difference in emitted intensity at points 302 and 304 is zero. In graph 400, there is rotation ($\Omega \neq 0$) and thus the difference in emitted intensity between points 402 and 404 is non-zero.

Figure 5:
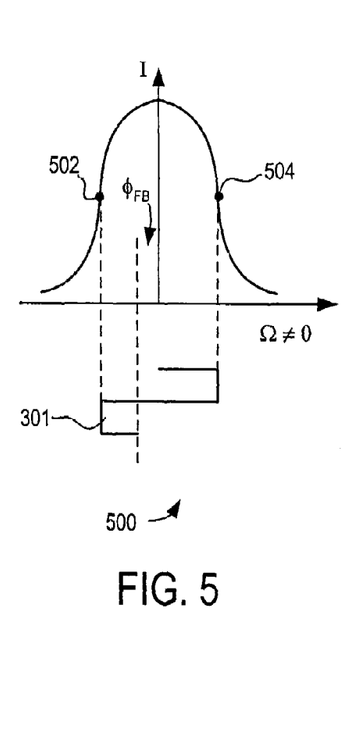

As stated above, in closed loop operation, the loop closure electronics 112 drives the integrated optical chip 106 with a feedback phase to keep the difference in emitted intensity at the two offset measuring points zero. Thus, the rotation rate measurement can be calculated from the feedback phase and delivered as output 116. Turning now to FIG. 5, graph 500 illustrates how a feedback phase shift $\phi_{FB}$, equal and opposite to the rotation-induced phase shift, is introduced to drive the difference in intensity at points 502 and 504 to zero. Thus, the rotation rate measurement can be calculated from the feedback phase shift $\phi_{FB}$. Specifically, the loop closure electronics can integrate the measured feedback phase shift $\phi_{FB}$ to obtain a value proportional to the rotated angle. The rotated angle can then calculated by multiplying the accumulated phase by a scaling factor.

Closed loop operation has many advantages over open loop operation. For example, by biasing to the same place on the raised cosine interferometer the output is extraordinarily linear and stable. Additionally, because the output 116 is derived from a measurement of phase, the output does not depend on the total intensity of measurements at the detector, which could vary in response to changes in temperature, radiation, vibration and electronics gain.

One issue in closed loop fiber optic gyroscopes is that the phase shift needed to null the intensity difference can increase beyond the output range of the IOC 106. For example, for a constant rate rotation situation the phase shift needed to null the intensity difference would be a continually increasing ramp. However, the amount of modulation that can be provided is limited by the range of the loop closure electronics 112 and the IOC 106. To avoid this problem a reset voltage is added or subtracted to the feedback modulation when the feedback modulation nears the drive voltage limit. For example, a reset voltage corresponding to a phase change of $2\pi$ can be added or subtracted from the feedback modulation voltage without generating a rate error. This periodic adjustment of the feedback modulation voltage is generally referred to as a $2\pi$ reset.

Figure 6:
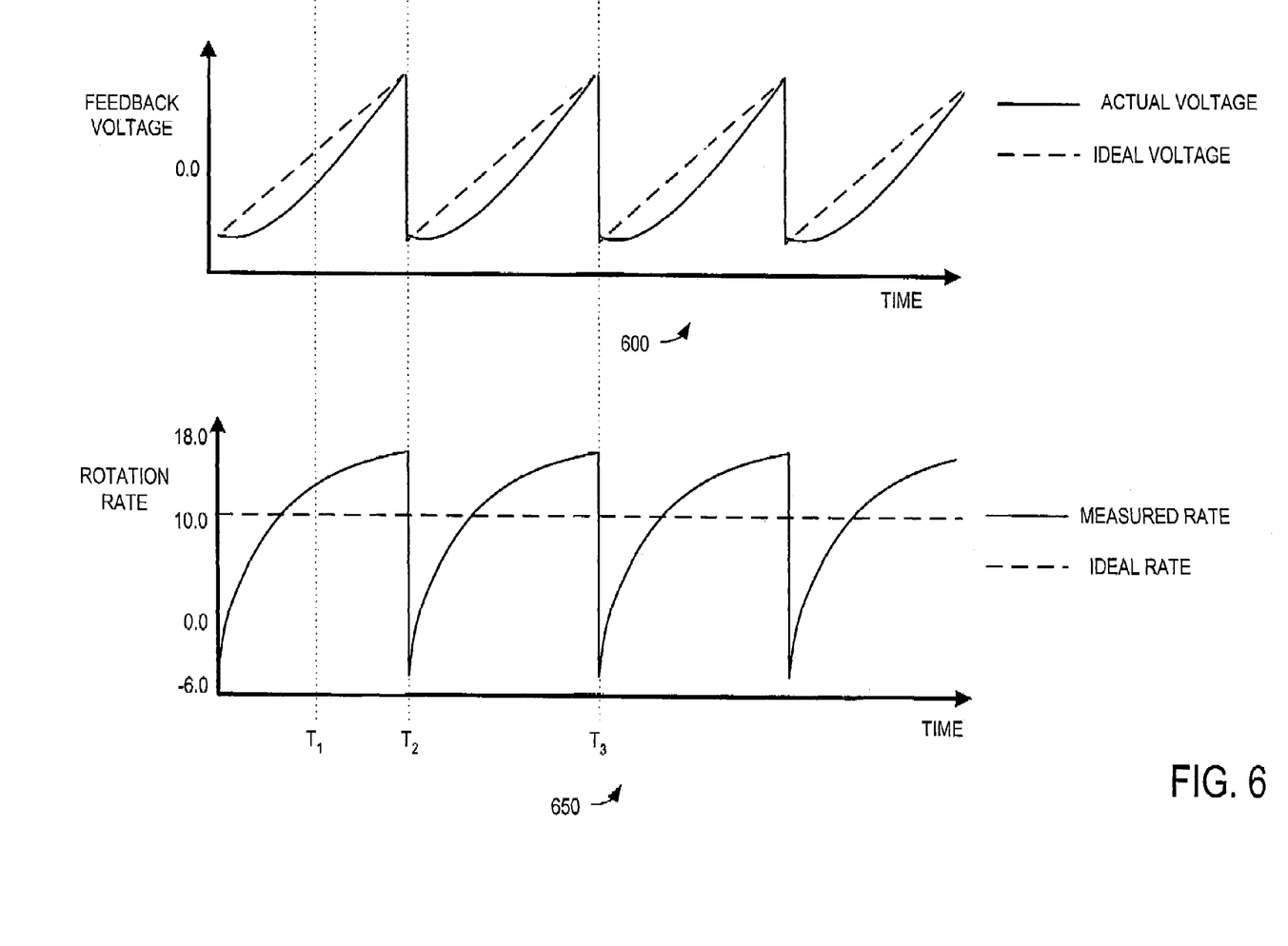
FIG. 6 is a graphical view of a feedback voltage and rotation rate without minimal bias switching for an ideal and typical phase modulator.

Turning now to FIG. 6, a graph 600 illustrates an exemplary feedback voltage and a graph 700 illustrates exemplary measured rotation rate in a fiber optic gyroscope. Specifically, graph 600 illustrates the actual feedback modulation voltage in a typical fiber optic gyroscope, illustrated with a solid line, along with an ideal feedback modulation voltage, illustrated with a dashed line. Likewise, graph 650 illustrates a measured rotation rate taken from the actual feedback voltage, illustrated with a solid line, along with an ideal measurement of rotation rate, illustrated with a dashed line. In the example of FIG. 6, the fiber optic gyroscope is experiencing a constant rotation rate. The constant rotation rate is reflected by the increasing ramp of feedback modulation voltage. For example, at time $T_1$, the feedback modulation voltage is increasing due to the rotation rate being experienced. As described above, a continuing rotation rate will eventually cause the modulation voltage to exceed the range of the loop closure electronics 112 and the IOC 106. Thus, at time $T_2$ a $2\pi$ reset is performed. In this example, the $2\pi$ reset corresponds to subtracting a voltage corresponding to a phase change of $2\pi$ from the feedback modulation voltage. The feedback modulation voltage then continues to increase again until the next $2\pi$ reset at time $T_3$.

As described above, one potential problem with the introduction of the $2\pi$ reset is the frequency dependent nature of $V_\pi$, where $V_\pi$ is the electrical-to-optical gain of the modulator in the IOC 106. Specifically, since rotation is based on the feedback voltage needed to null the induced phase shift, the frequency dependence of $V_\pi$ introduces a rate error that can be significant for some applications. In graph 600, the frequency dependent nature of $V_\pi$ results in the actual feedback voltage being distorted. Specifically, instead of following an ideal saw-tooth pattern, the actual feedback voltage is curved downward at the $2\pi$ by the frequency dependent nature of $V_\pi$.

The distortion of the feedback voltage results in an error in the measured rotation rate. Specifically, in a closed loop fiber optic gyroscope the measured rotation rate is equal to the slope of the feedback voltage. Thus, the distortions in the feedback voltage cause an error in the measured rotation rate. This is illustrated in graph 650. Again, in an ideal example, a constant rotation rate would cause an ideal saw-tooth pattern in the feedback voltage measured, and a constant measurement of rate. In graph 650 this is illustrated by the constant ideal rotation rate of approximately 10.0. However, the distortion in the feedback voltage causes errors in the rotation rate. As illustrated in graph 650, these errors manifest themselves as lower measured rotation rates at some times, and higher rates at others.

In IFOG 100, the bias switching mechanism 130 provides a mechanism for reducing the sensitivity of the rotation rate measurement to the frequency dependence of the feedback modulator. Specifically, the bias switching mechanism 130 reduces rate errors associated with the low frequency $2\pi$ resets. In general, the bias switching mechanism 130 reduces the low frequency components of the feedback modulation drive by increasing the frequency of the $2\pi$ resets. Thus, the bias switching mechanism 130 reduces the low frequency component of the IOC 106 drive to avoid errors that occur with the low frequency $2\pi$ resets.

Figure 7:
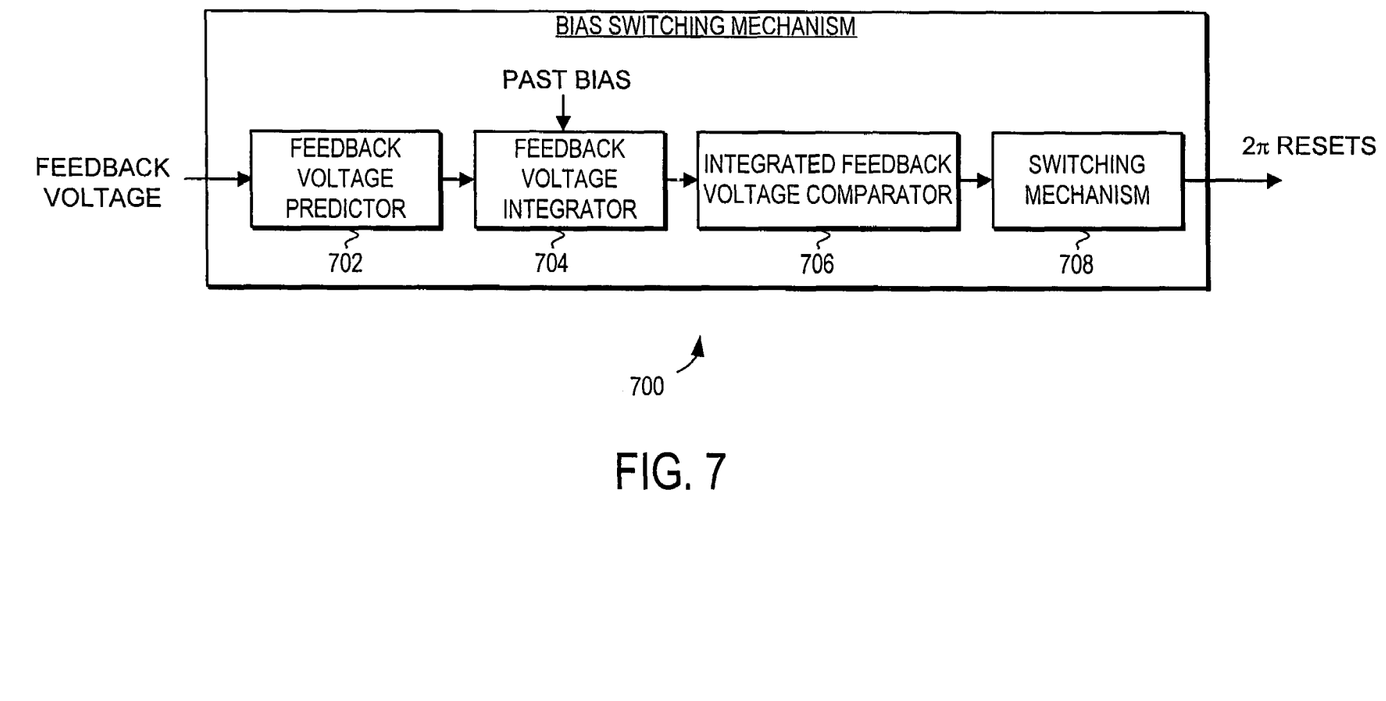
FIG. 7 is a schematic view of a bias switching mechanism in accordance with an embodiment of the invention.

Turning now to FIG. 7, a specific embodiment of a bias switching mechanism is illustrated. The bias switching mechanism 700 includes a feedback voltage predictor 702, a feedback voltage integrator 704, an integrated feedback voltage comparator 706, and a switching mechanism 708. The bias switching mechanism 700 is exemplary of the type of mechanism that can be used in a closed-loop fiber-optic gyroscope such as gyroscope 100. In operation, the bias switching mechanism 700 receives feedback voltage from the loop closure electronics introduces a $2\pi$ reset if such a reset is predicted to reduce the integrated voltage of the modulator bias. Specifically, the feedback voltage predictor 702 receives the current feedback voltage and predicts a future feedback voltage for both with and without a $2\pi$ reset. The predicted future feedback voltages are then passed to the feedback voltage integrator 704. The feedback voltage integrator 704 integrates the future feedback voltages and sums with past bias voltages to determine the integrated modulator bias for both with and without a $2\pi$ reset. The integrated feedback voltage comparator 706 compares the integrated modulator bias for both with and without a $2\pi$ reset. Then, switching mechanism 708 selects the option that results in the integrated modulator bias being closest to zero. Specifically, the switching mechanism 708 introduces a $2\pi$ reset if the $2\pi$ reset will reduce the magnitude of the integrated bias voltage. If a $2\pi$ reset would instead increase the magnitude, then the 2π reset is not performed. During operation of the gyroscope, the bias switching mechanism 700 will repeatedly receive the feedback voltage, evaluate whether a 2π reset will reduce the integrated voltage of the modulator bias, and selectively introduce 2π resets in such a way that integrated modulator bias minimized.

Figure 8:
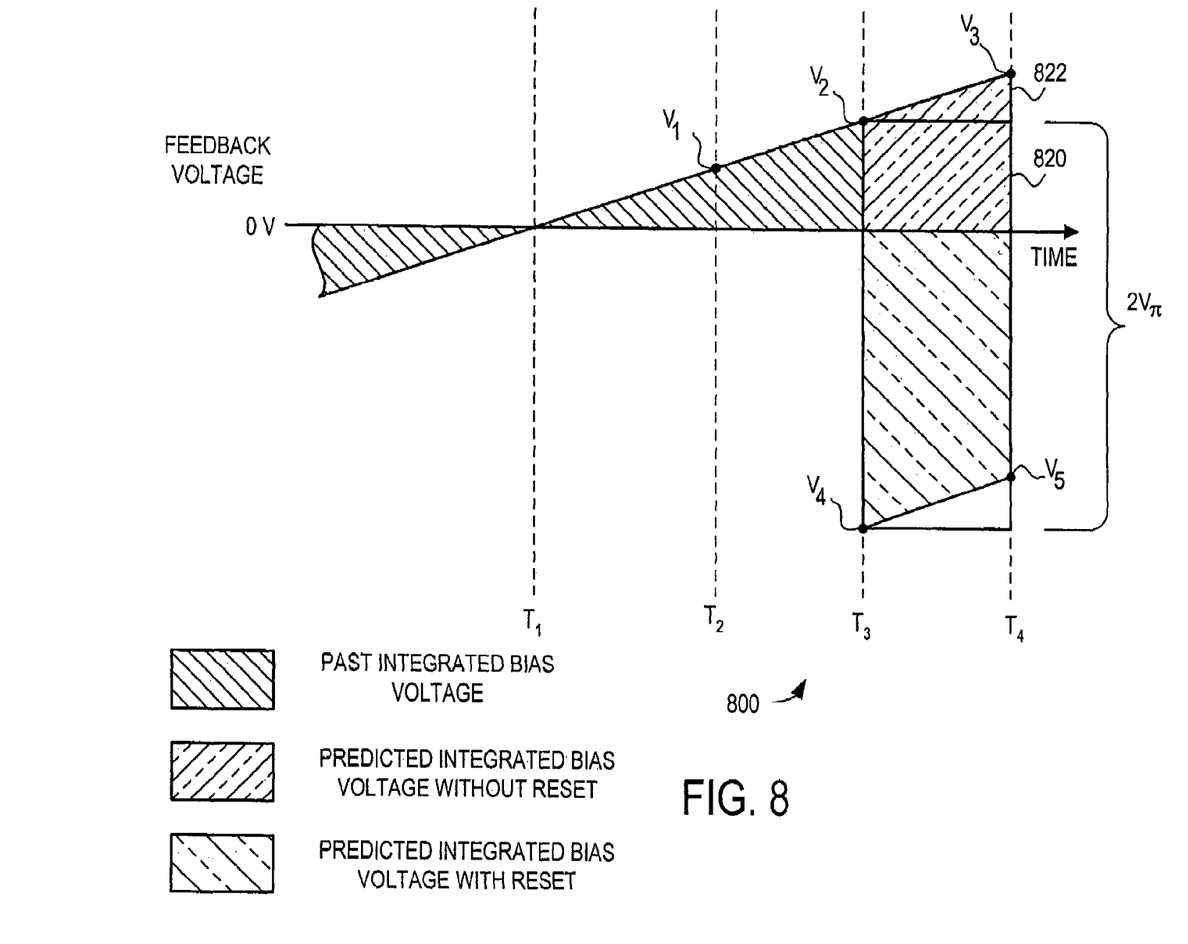
FIG. 8 is a graphical view of an accumulated modulated bias voltage prediction technique in accordance with an embodiment of the invention.

Turning now to FIG. 8, a graph 800 illustrates one example of how the bias switching mechanism can predict the integrated modulator bias for both with and without a 2π reset. In the illustrated example, the feedback voltage is an increasing ramp, crossing zero at time $T_1$. The past modulator bias is defined as the summation of the past feedback voltage, with a predetermined level of bias defined as the zero level and bias below that level is integrated as negative.

In the illustrated example, at time $T_3$, the bias switching mechanism predicts the integrated modulator bias for both with and without a 2π reset. Specifically, the bias switching mechanism predicts the integrated modulator bias that will occur at time $T_4$. This involves determining the current rate of change in the feedback voltage generated by the loop closure electronics and projecting that rate of change forward. The rate of change can be calculated by examining the feedback voltage at a previous time period, and comparing it to the current feedback voltage. For example, by determining the previous feedback voltage $V_1$ at time $T_2$, the current feedback voltage $V_2$ at time $T_3$, and the time difference between $T_2$ and $T_3$, the average rate of change of the feedback voltage between $T_2$ and $T_3$ is calculated. That rate of change, or slope of the feedback voltage is then is then used to predict the feedback voltage $V_3$ at time $T_4$ without a 2π reset. Furthermore, by subtracting $V_\pi$ from that value it is also used to predict the feedback voltage $V_5$ with a 2π reset. The predicted feedback voltages $V_3$ and $V_5$ can then be used to predict the future modulator bias for both with and without a 2π reset.

As one example, the future integrated modulator bias without a 2π reset is predicted by determining the area under the feedback voltage between points $V_2$ and $V_3$. This can be calculated by determining the area of the rectangle 820 and the area of the triangle 822. The area of the rectangle 820 is defined as:

$$V_2(T_4-T_3) \qquad (1)$$

while the area of the triangle 822 is defined as:

$$\frac{(V_3 - V_2)(T_4 - T_3)}{2} \qquad (2)$$

With the predicted future integrated modulator bias calculated, it is added to the past modulated bias to predict an overall integrated modulator bias without a 2π reset.

Then, the same calculation can be used to predict an overall integrated modulator bias with a 2π reset. Specifically, taking the predicted overall integrated modulator bias without 2π reset and subtracting $2V_\pi(T_4-T_3)$ gives the prediction for the overall integrated modulator bias with a 2π reset. By comparing the predictions of overall integrated modulator bias the bias switching mechanism can select the option that results in the integrated modulator bias being closest to zero. Thus, if a reset would reduce the magnitude of the integrated modulator bias then the reset is performed. If a reset would instead increase the magnitude, then it is not performed.

The result of predicting the integrated bias voltage and selectively performing 2π resets is that the 2π resets are performed at a higher frequency selected to drive the integrated bias voltage closer to zero. For instance, if the bias voltage is $$\frac{\pi}{5} \cdot V_\pi$$

volts, then the minimal bias switching technique will cause the feedback voltage to be at $$\frac{\pi}{5} \cdot V_\pi$$

for 90% of the time and at $$\frac{-9\pi}{5} \cdot V_\pi$$

for 10% of the time. At an integrated bias voltage of zero volts, no switching will occur, and at a bias voltage of $V_\pi$, the minimal bias switching technique will switch with a 50-50 duty cycle between $V_\pi$ and $-V_\pi$.

As stated above, during operation of the IFOG, the bias switching mechanism will repeatedly evaluate whether a 2π reset will reduce the integrated voltage of the modulator bias, and select the option that results in the integrated modulator bias being closest to zero. The maximum rate at which the evaluation occurs, i.e., the rate that a 2π reset can be triggered, depends on the number of τ used to demodulate the rate signal. A faster evaluation rate is desired to increase the high frequency content of the feedback modulation drive signal The method of calculating the integrated bias would typically depend on the rate of bias modulation evaluations. For example, to predict the integrated bias of a normal phase ramp for a predetermined timeframe in the future, the integrated bias history is added to the change in integrated bias during the previous predetermined timeframe plus the current bias value times the predetermined timeframe. This value is compared to the value obtained by adding or subtracting $2V_\pi$ times the predetermined timeframe to the normal phase ramp prediction. If the bias voltage is positive, then only a negative 2π reset needs to be considered, and conversely for a negative bias voltage, only a positive 2π reset needs to be considered.

In one specific embodiment of bias switching mechanism, the bias switching mechanism evaluates the possibility of a 2π reset once every 8 loop transit times, where the loop transit time is commonly referred to as τ. In this embodiment, to predict the integrated bias of a normal phase ramp 8 τ in the future, the integrated bias history is added to the change in integrated bias during the previous 8 τ and the current bias times 8. This value is compared to the value obtained by adding or subtracting $2V_\pi$ times 8 to the normal phase ramp prediction. Again, if the bias voltage is positive, then only a negative 2π reset needs to be considered, and conversely for a negative bias voltage, only a positive 2π reset needs to be considered. If the prediction with the lowest integrated bias is the prediction with the 2π reset, then the modulator drive feedback voltage is changed by an additional $2V_\pi$.

Figure 9:
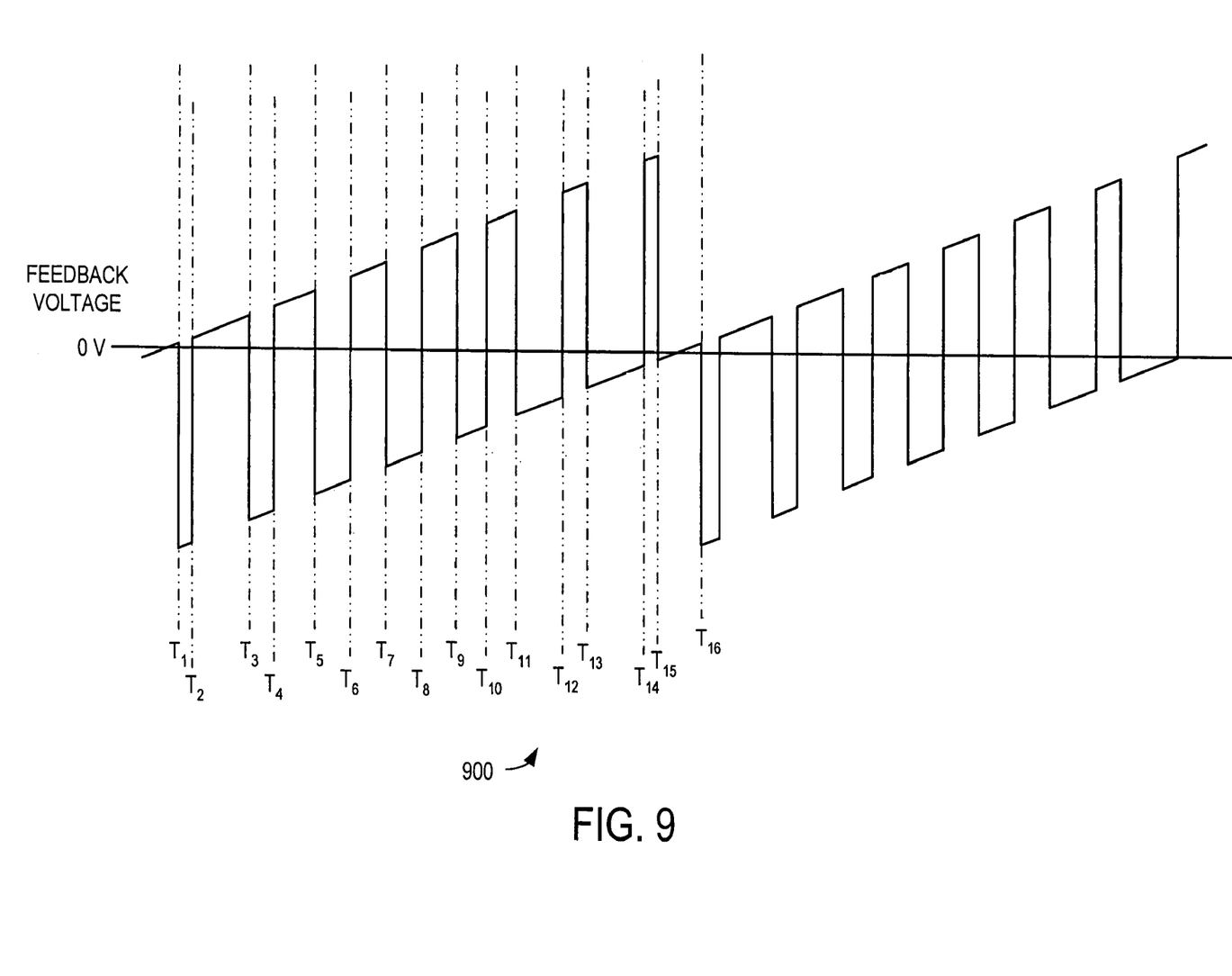
FIG. 9 is a graphical view of the feedback voltage with minimal bias switching in accordance with an embodiment of the invention.

Turning now to FIG. 9, a graph 900 illustrates how bias switching mechanism 130 reduces the low frequency components of the feedback modulation drive by increasing the frequency of the 2π resets. Again, in operation, the bias switching mechanism 130 performs a 2π reset if such a reset is predicted to reduce the integrated voltage of the modulator bias. Specifically, the bias switching mechanism 130 predicts the integrated modulator bias for both with and without a 2π reset. Then, the bias switching mechanism 130 selects the option that results in the integrated modulator bias being closest to zero. During operation of the gyroscope, the bias switching mechanism 130 will thus repeatedly evaluate whether a 2π reset will reduce the integrated voltage of the modulator bias, and select the option that results in the integrated modulator bias being closest to zero. In graph 800, the feedback voltage is illustrated to show how the bias switching mechanism 130 will perform multiple 2π resets, in addition to those 2π resets performed to prevent the voltage from exceeding the drive circuitry limits. It should be noted that graph 900 is simplified in that it does not illustrate other modulations in the feedback voltage, such as those that would be performed for bias modulation. In the illustrated example, the bias switching mechanism 130 repeatedly evaluates 2π resets and selectively performs the resets. This results in resets occurring at each of the times $T_1$-$T_{15}$. Then, at time $T_{16}$, a "normal" 2π reset selected to prevent exceeding the drive circuitry limit occurs. Following time $T_{16}$ multiple 2π resets for reducing the integrated modulator bias are again performed. Thus, the bias switching mechanism 130 greatly increases the number of 2π resets that are performed, and thus increases the frequency of the feedback modulation.

Since the feedback voltage changes with rotation rate and the 2π switching frequency changes with drive voltage, the net result is that the minimal bias switching mechanism 130 generates a feedback voltage with a significantly reduced rate-dependent low frequency component. As a consequence, the rotation rate errors associated to phase modulators with a difference in low and high frequency response are significantly reduced because resets no longer occur at low frequencies.

In addition, the frequency response of the phase modulator is often unstable, and dependent upon environmental factors such as temperature, radiation, humidity, and pressure. As a consequence, by reducing sensitivity to the phase modulators unstable low frequency response, the rate offset stability of the closed-loop fiber optic gyroscope is improved. The high frequency response of phase modulators can also be unstable, but this does not present a problem as various Vπ measurement techniques can accurately track the changes in the high frequency Vπ value.

Hysteresis is typically required in the traditional feedback modulation technique to prevent multiple 2π resets occurring at the edge of the modulation voltage range. With the minimal bias switching technique, hysteresis is no longer necessary as 2π resets can occur at all voltage levels. As a consequence, the minimal bias switching technique produces a symmetric modulator voltage range between positive and negative rotation rates. This symmetry in the bias modulation reduces scale factor asymmetries between positive and negative rotation rates.

To summarize, the minimal bias switching technique introduces high frequency 2π stepping in the closed-loop feedback modulation to reduce errors associated with a phase modulator with a different response at low and high frequencies. Compared to traditional closed-loop feedback solutions, the minimal bias switching technique reduces rate-dependent errors associated to 2π resets, increases rate offset stability, and improves the scale factor symmetry between positive and negative rotation rates.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A bias switching mechanism for a closed-loop fiber optic gyroscope, the bias switching mechanism adapted to compare a predicted integrated bias voltage with a 2π reset to a predicted integrated bias voltage without a 2π reset, wherein the bias switching mechanism is operable, in response thereto, to introduce 2π resets in the fiber optic gyroscope when the predicted integrated bias voltage without a 2π reset is greater than the predicted integrated bias voltage with a 2π reset.

2. The bias switching mechanism of claim 1 wherein the bias switching mechanism compares the integrated bias voltage with a 2π reset to the integrated bias voltage without a 2π reset at a rate proportional to a loop transit time in the fiber optic gyroscope.

3. The bias switching mechanism of claim 1 wherein the bias switching mechanism compares the integrated bias voltage with a 2π reset to the integrated bias voltage without a 2π reset every 8th loop transit time in the fiber optic gyroscope.

4. The bias switching mechanism of claim 1 wherein the bias switching mechanism is adapted to predict a future feedback voltage with a 2π reset and to predict a future feedback voltage without a 2π reset, and wherein the bias switching mechanism is further adapted to determine the predicted integrated bias voltage with the 2π reset from the predicted future feedback voltage with a 2π reset, and further adapted to determine the predicted integrated bias voltage without a 2π reset from the predicted future feedback voltage without a 2π reset.

5. The bias switching mechanism of claim 4 wherein the bias switching mechanism predicts a future feedback voltage with a 2π reset and predicts a future feedback voltage without a 2π reset by calculating a current rate of change of a feedback voltage.

6. A method of reducing frequency effects caused by 2π resets in a closed-loop fiber-optic gyroscope, the method comprising the steps of predicting an integrated bias voltage with an 2π reset; predicting an integrated bias voltage without a 2π reset; and introducing a 2π reset in the fiber-optic gyroscope when the predicted integrated bias voltage without a 2π reset is greater than the predicted integrated bias voltage with a 2π reset.

7. The method of claim 6 wherein the step of predicting an integrated bias voltage with a 2π reset comprises predicting a future feedback voltage with a 2π reset and wherein the step of predicting an integrated bias voltage without a 2π reset comprises predicting a future feedback voltage without a 2π reset.

8. The method of claim 7 wherein the step of predicting a future feedback voltage with a 2π reset and wherein the step of predicting an integrated bias voltage without a 2π reset comprises calculating a current rate of change of the feedback voltage.

9. The method of claim 8 wherein the steps of predicting an integrated bias voltage with an 2π reset, predicting an integrated bias voltage without a 2π reset, and introducing a 2π reset when the predicted integrated bias voltage with a 2π reset is greater than the predicted integrated bias voltage without a 2π reset are repeatedly performed at a rate proportional to a loop transit time in the fiber optic gyroscope.

10. The method of claim 6 wherein the steps of predicting an integrated bias voltage with an 2π reset, predicting an integrated bias voltage without a 2π reset, and introducing a 2π reset when the predicted integrated bias voltage with a 2π reset is greater than the predicted integrated bias voltage without a 2π reset are repeatedly performed at least every 8th loop transit time in the fiber optic gyroscope.

11. A bias switching mechanism for a fiber optic gyroscope, the fiber optic gyroscope including an optical path having a transit time, the bias switching mechanism comprising: a feedback voltage predictor, the feedback voltage predictor adapted to receive a feedback voltage and, in response thereto, to predict a future feedback voltage with a 2π reset and predict a future feedback voltage without a 2π reset; an integrator, the integrator adapted to predict an integrated bias voltage with a 2π reset based at least in part on the future feedback voltage with a 2π reset, and further adapted to predict an integrated bias voltage without a 2π reset based at least in part on the future feedback voltage without a 2π reset; a comparator, the comparator adapted to compare the integrated bias voltage with a 2π reset with the integrated bias voltage without a 2π reset; and a switching mechanism, the switching mechanism adapted to selectively introduce 2π resets in the fiber optic gyroscope when the predicted integrated bias voltage without a 2π reset is greater than the predicted integrated bias voltage with a 2π reset.

12. The switching mechanism of claim 11 wherein the comparator compares the integrated bias voltage with a 2π reset with the integrated bias voltage without a 2π reset and the switching mechanism selectively introduces 2π resets at a rate proportional to a loop transit time in the fiber optic gyroscope.

13. The switching mechanism of claim 11 wherein the comparator compares the integrated bias voltage with a 2π reset with the integrated bias voltage without a 2π reset and the switching mechanism selectively introduces 2π resets every 8th loop transit time in the fiber optic gyroscope.

14. The bias switching mechanism of claim 11 wherein the feedback voltage predictor predicts a future feedback voltage with a 2π reset and predicts a future feedback voltage without a 2π reset calculating a current rate of change of the feedback voltage.

* * * * *